United States Patent
Thota et al.

(10) Patent No.: US 11,188,359 B2
(45) Date of Patent: Nov. 30, 2021

(54) ELECTRONIC DEVICE AND SCREEN CAPTURING METHOD THEREOF

(71) Applicant: SAMSUNG ELECTRONICS CO., LTD., Suwon-si (KR)

(72) Inventors: Siva Prasad Thota, Bengaluru (IN); Naresh Purre, Bengaluru (IN); Debi Prasanna Mohanty, Bengaluru (IN); Sukumar Moharana, Bengaluru (IN); Rachit Sindhi Munjal, Bengaluru (IN); Manoj Goyal, Bengaluru (IN); Divija Nagaraju, Bengaluru (IN); Kriti Singh, Bengaluru (IN); Deepak Garg, Bengaluru (IN); Chirag Batra, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/027,033

(22) Filed: Sep. 21, 2020

(65) Prior Publication Data

US 2021/0089334 A1    Mar. 25, 2021

(30) Foreign Application Priority Data

Sep. 20, 2019  (IN) ............................ 201941038104
Sep. 9, 2020   (IN) ............................ 201941038104

(51) Int. Cl.
*G06F 3/048*   (2013.01)
*G06F 9/451*   (2018.01)
(Continued)

(52) U.S. Cl.
CPC ............ *G06F 9/453* (2018.02); *G06F 3/0484* (2013.01); *G06K 9/00463* (2013.01); *G06K 9/6201* (2013.01)

(58) Field of Classification Search
CPC .... G06F 9/453; G06F 3/0484; G06F 11/3438; G06F 11/34; G06F 2201/86; G06F 9/451;
(Continued)

(56) References Cited

U.S. PATENT DOCUMENTS 8,478,072 B2   7/2013   Aisaka et al.
8,560,943 B2   10/2013  Chen et al.
(Continued)

FOREIGN PATENT DOCUMENTS

| JP | 2011-176748 A | 9/2011 |
| KR | 10-2015-0111233 A | 10/2015 |
| KR | 10-2016-0018769 A | 2/2016 |

OTHER PUBLICATIONS

Anonymous, "On Device AI", Jul. 2019. (100 pages total).
(Continued)

*Primary Examiner* — Alex Olshannikov
(74) *Attorney, Agent, or Firm* — Sughrue Mion, PLLC

(57) ABSTRACT

A method for intelligent screen capture in an electronic device includes: receiving, by the electronic device, a user input for capturing a screenshot of contents displayed on a screen of the electronic device; dividing, by the electronic device, the screen of the electronic device into a plurality of blocks, each of the plurality of blocks including inter-related contents displayed on the screen of the electronic device; identifying, by the electronic device, at least one block from the plurality of blocks based on a plurality of parameters; and displaying, by the electronic device, a guide user interface for capturing the screenshot of the at least one block.

18 Claims, 11 Drawing Sheets

(51) Int. Cl.
*G06K 9/00* (2006.01)
*G06F 3/0484* (2013.01)
*G06K 9/62* (2006.01)

(58) Field of Classification Search
CPC ... G06K 9/00463; G06K 9/6201; H04L 67/22
USPC .......................................................... 715/704
See application file for complete search history.

(56) References Cited

U.S. PATENT DOCUMENTS

| | | | |
|---|---|---|---|
| 8,812,969 | B2 | 8/2014 | Hart et al. |
| 9,570,041 | B2 | 2/2017 | Kumar et al. |
| 9,798,708 | B1 | 10/2017 | Sharifi et al. |
| 9,811,352 | B1 * | 11/2017 | Sharifi ................. G06F 16/156 |
| 9,870,633 | B2 | 1/2018 | Kraft et al. |
| 9,983,770 | B2 | 5/2018 | Zheng |
| 10,417,316 | B2 | 9/2019 | Leventhal |
| 2011/0206282 | A1 | 8/2011 | Aisaka et al. |
| 2012/0044137 | A1 * | 2/2012 | Oddiraju ............ H04N 21/4184 345/156 |
| 2014/0013258 | A1 * | 1/2014 | Jang ...................... G06F 3/0484 715/770 |
| 2016/0313883 | A1 | 10/2016 | Zhang |
| 2016/0378307 | A1 | 12/2016 | Blohowiak et al. |
| 2018/0114326 | A1 | 4/2018 | Roblek et al. |
| 2021/0048938 | A1 * | 2/2021 | Scott, II ............... G06K 9/3233 |

OTHER PUBLICATIONS

Anonymous, "Alive Shot—Block Detection & Grouping Logic", Aug. 14, 2019. (42 pages total).
Communication dated Dec. 8, 2020, issued by the International Searching Authority in counterpart International Application No. PCT/KR2020/012690 (PCT/ISA/210 and 237).

* cited by examiner

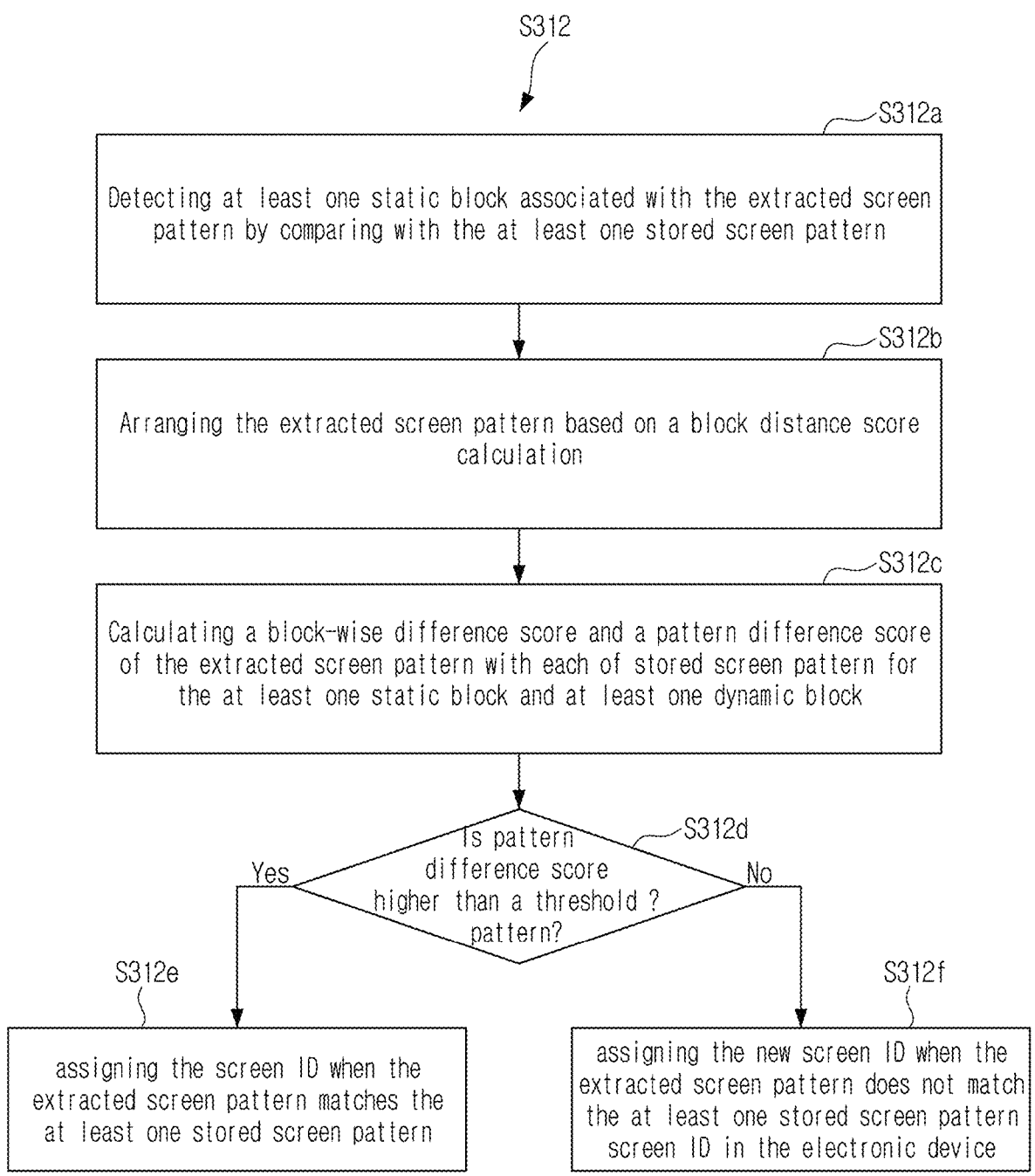

ELECTRONIC DEVICE AND SCREEN CAPTURING METHOD THEREOF

CROSS-REFERENCE TO RELATED APPLICATION(S)

This application is based on and claims priority under 35 U.S.C. § 119 to Indian Patent Application No. 201941038104, filed on Sep. 20, 2019, and Indian Patent Application No. 201941038104, filed on Sep. 9, 2020 in the Indian Intellectual Property Office, the disclosures of which are incorporated by reference herein in their entireties.

BACKGROUND

1. Field

The present disclosure relates to user interface, and, more specifically, to a method and an electronic device for intelligent screen capture.

2. Description of Related Art

Continuous development of technologies and popularity of electronic device such as smart phone, there are more and more functionality added in the electronic device. Nowadays, a screenshot functionality is inevitable to be used by a user of the electronic device. In an existing system, the user of the electronic device capture a full-screenshot by using one of a gesture of the user of the electronic device, presses a shutdown button and a home button of the electronic device at the same time, or any other combination. Further, some of the existing system provides an additional functionality to the user of the electronic device such as a capture partial area of the full-screenshot. However, there is a drawback in the existing system, for the capture partial area of the full-screenshot, the user of the electronic device has to manually crop and select the screenshot content from the full-screen screenshot. The existing systems are slow in processing and requires manual adjustment by the user of the electronic device leading to poor user experience. There is no mechanism in the existing systems to recognize most prominent block required to the user of the electronic device and capture the screenshot accordingly.

Thus, it is desired to address the above mentioned disadvantages or other shortcomings or at least provide a useful alternative.

SUMMARY

Embodiments provide an apparatus and a method for recognizing user intended content such as image, text, icon, and symbols from a screenshot or series of screen shots over a period of time in an electronic device and capture the screenshot accordingly provides better user experience. In accordance with an aspect of the disclosure, there is provided a method for intelligent screen capture in an electronic device. The method includes receiving, by the electronic device, a user input for capturing a screenshot of contents displayed on a screen of the electronic device. Further, the method includes identifying, by the electronic device, the screen of the electronic device into a plurality of blocks, wherein each of the blocks includes inter-related contents displayed on the screen of the electronic device. Further, the method includes identifying, by the electronic device, at least one block from the plurality of blocks based on a plurality of parameters. Further, the method includes displaying, by the electronic device, a guide user interface for capturing the screenshot of the at least one block. The screenshot of the at least one block is stored in the electronic device and performs at least one-second action, the at least one-second action includes at least one of editing on the screenshot of the at least one block and sharing the screenshot of the at least one block to at least one second user.

In accordance with an aspect of the disclosure, the method includes identifying at least one block from the plurality of blocks based on the plurality of parameters includes mapping of each block from the plurality of blocks based on the plurality of parameters to obtain rank of the each block, and selecting at least one block having a highest rank from the plurality of blocks as the at least one block to capture the screenshot. The plurality of parameters includes at least one of a layout of the blocks, an application type, a type of content, an application ID, a screen ID and user-specific parameters including at least one of a history of user action specific to a contents type, a current location of the user, and a browsing pattern or history of the user. The at least one block is highlighted to capture the screenshot. The ranking is modified based on at least one action associated with the user of the electronic device, wherein the at least one action includes a zoom-in action, a zoom-out action, and a scrolling action. The plurality of blocks includes at least one of at least one image block, at least one icon block, and at least one text block.

In accordance with an aspect of the disclosure, the method includes identifying the screen of the electronic device into the plurality of blocks includes recognizing the contents displayed on the screen of the electronic device, identifying a relationship between the contents displayed on the screen of the electronic device based on the recognition, and identifying the screen of the electronic device based on the relationship between the contents displayed on the screen of the electronic device. The contents are recognized by at least one of a position of each block, proximity of each block, and dimensions of each block.

In accordance with an aspect of the disclosure, the method includes identifying the screen of the electronic device based on the relationship between the contents displayed on the screen of the electronic device to obtain the screen ID of the contents displayed on the screen of the electronic device. Further, the method includes extracting, by the electronic device, a screen pattern based on the identified screen of the electronic device. Further, the method includes identifying, by the electronic device, whether the extracted screen pattern matches at least one stored screen pattern of the electronic device. Further, the method includes assigning the screen ID to the contents displayed on the screen of the electronic device in response to identifying that the extracted screen pattern matches the at least one stored screen pattern. Further, the method includes assigning a new screen ID to the contents displayed on the screen of the electronic device in response to identifying that the extracted screen pattern does not match with the at least one stored screen pattern and store the new screen ID in the electronic device.

In accordance with an aspect of the disclosure, the method includes identifying whether the extracted screen pattern matches at least one stored screen pattern of the electronic device includes receiving, by the electronic device, at least one static block associated with the extracted screen pattern by comparing with the at least one stored screen pattern. Further, the method includes arranging, by the electronic device, the extracted screen pattern based on a block distance score calculation. Further, the method includes calculating, by the electronic device, a block-wise difference score and a pattern difference score of the extracted screen pattern with each of stored screen pattern for the at least one static block and at least one dynamic block. Further, the method includes identifying, by the electronic device, whether the pattern difference score is higher than a threshold. Further, the method includes the extracted screen pattern matches the at least one stored screen pattern in response to identifying that the pattern difference score is higher than the threshold. Further, the method includes the extracted screen pattern does not match with the at least one stored screen pattern in response to identifying that the pattern difference score is lower than the threshold.

In accordance with an aspect of the disclosure, the method includes identifying, by the electronic device, whether at least one suggestion for the at least one block receives from a user of the electronic device. Further, the method includes sharing the screenshot of the at least one block to the at least one second user in response to identifying that at least one suggestion for the at least one block does not receive from a user of the electronic device. Further, the method includes sharing the screenshot of at least one suggested block to the at least one second user in response to identifying that at least one suggestion for the at least one block receives from the user of the electronic device.

Embodiment provide the electronic device for intelligent screen capture. The electronic device includes a screenshot controller coupled with a processor, display and a memory. The screenshot controller is configured to receive a user input for capturing a screenshot of contents displayed on a screen of the electronic device. Further, the screenshot controller is configured to identify the screen of the electronic device into a plurality of blocks, wherein each of the blocks includes inter-related contents displayed on the screen of the electronic device. Further, the screenshot controller is configured to identify at least one block from the plurality of blocks to capture the screenshot based on a plurality of parameters. Further, the screenshot controller is configured to control the display to display a guide user interface for capturing the screenshot of the at least one block.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and/or other aspects, features, and advantages of certain embodiments of the present disclosure will be more apparent from the following description, taken in conjunction with the accompanying drawings, in which:

FIGS. 3B, 3C, and 3D is a flow diagram illustrating a method for determining whether the extracted screen pattern matches at least one stored screen pattern of the electronic device, according to an embodiment;

DETAILED DESCRIPTION

Figure 1:
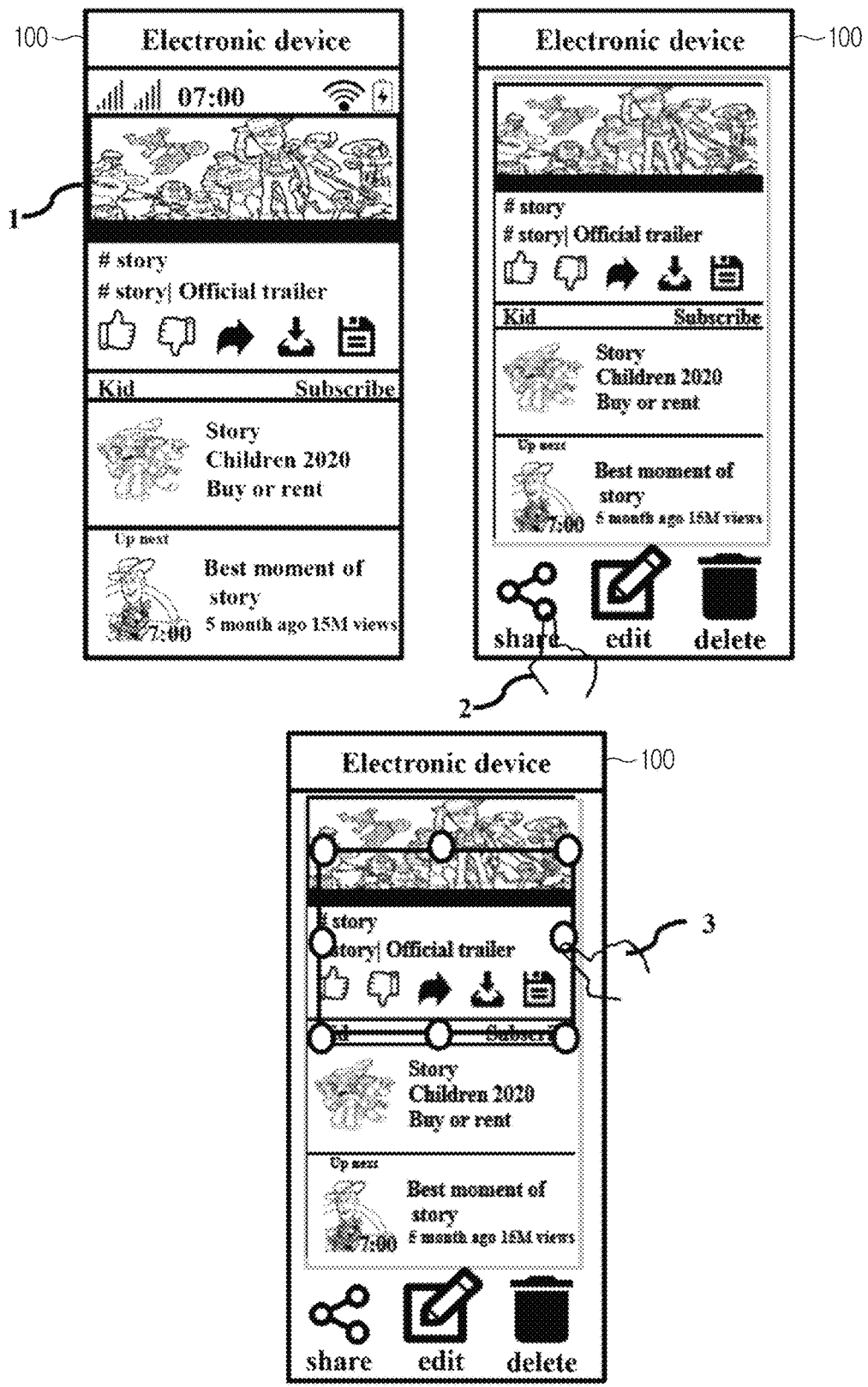
FIG. 1 is an example illustration in which an existing system provides a manually customized screenshot for an electronic device, according to a related art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for intelligent screen capture in an electronic device. The method includes detecting, by the electronic device, a screenshot capture event to capture a screenshot of contents displayed on a screen of the electronic device. Further, the method includes dividing, by the electronic device, the screen of the electronic device into a plurality of blocks, wherein each of the blocks includes inter-related contents displayed on the screen of the electronic device. Further, the method includes determining, by the electronic device, at least one optimal block from the plurality of blocks to capture the screenshot based on a plurality of parameters. Further, the method includes capturing, by the electronic device, the screenshot of the at least one optimal block.

Referring now to the drawings, and more particularly to FIGS. 2 through 5, there are shown preferred embodiments.

FIG. 1 is an example illustration in which an existing system provides a manually customized screenshot for an electronic device (100), according to a related art. The electronic device (100) can be, for example, but not limited to a smart phone, a laptop, a desktop, a smart watch, a smart TV, etc.

At 1, a user of the electronic device (100) watching a video on a video application of the electronic device (100). At 2, the user of the electronic device (100) uses a screenshot functionality of the electronic device (100). The user of the electronic device (100) captures a full-screenshot by using one of a gesture of the user of the electronic device (100), press a shutdown button and a home button of the electronic device (100) at the same time, or any other combination. Furthermore, the user of the electronic device (100) performs one of shares the captured full-screenshot with at least one second user, edits the captured full-screenshot then shares with the at least one second user, saves the captured full-screenshot in the electronic device (100). At 3, the user of the electronic device (100) captures partial area of the full-screenshot, the user of the electronic device (100) has to perform manually cuts and selects the screenshot content on the full-screen screenshot. So, the existing methods and system, slows in processing and requires manual adjustment by the user of the electronic device (100) leading to poor user experience.

Figure 2A:
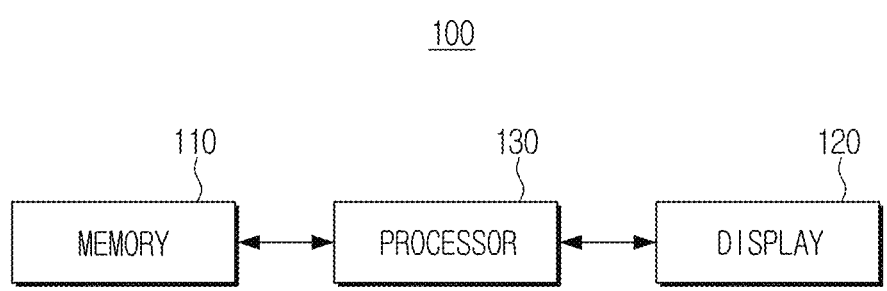
FIG. 2A illustrates a block diagram of the electronic device for intelligent screen capture, according to an embodiment.

FIG. 2A illustrates a block diagram of the electronic device for intelligent screen capture, according to an embodiment.

The memory (110) may be realized as a memory of various formats such as a hard disk drive (HDD), a solid state drive (SSD), a DRAM memory, an SRAM memory, an FRAM memory, or a flash memory.

Specifically, an artificial intelligence model may be stored in the memory (110). Here, the artificial intelligence model may be learned. In addition, the artificial intelligence model may include an upscaling module for increasing the resolution of the input image.

The processor (130) generally controls the operation of the electronic device (100).

According to an embodiment, the processor (130) may be realized as a digital signal processor (DSP), a microprocessor, or a time controller (TCON). However, without being limited thereto, the processor (130) may include at least one of a central processing unit (CPU), a microcontroller unit (MCU), a micro processing unit (MPU), a controller, an application processor (AP), a communication processor (CP), or an ARM processor or may be defined by the corresponding term. In addition, the processor (130) may be realized as a system on chip (SoC) or large scale integration (LSI) with a built-in processing algorithm or may be realized in the form of a field programmable gate array (FPGA).

An electronic device (100) for intelligent screen capture may include a memory (110), and a processor (130), coupled with the memory (110). Here, the processor (130) may receive a user input for capturing a screenshot of contents displayed on a screen of the electronic device (100), identify the screen of the electronic device (100) into a plurality of blocks. Here, each of the blocks includes inter-related contents displayed on the screen of the electronic device (100). Also, the processor (130) may identify at least one block from the plurality of blocks based on a plurality of parameters, and control the display (120) to display a guide user interface for capturing the screenshot of the at least one block.

The processor (130), coupled with the memory (110), may receive a user input for capturing a screenshot of contents displayed on a screen of the electronic device (100). Also, the processor (130) may identify the screen of the electronic device (100) into a plurality of blocks.

Here, each of the blocks includes inter-related contents displayed on the screen of the electronic device (100). The processor (130) may identify at least one block from the plurality of blocks based on a plurality of parameters, and may control the display (120) to display a guide user interface for capturing the screenshot of the at least one block.

Here, the processor (130) may map of each block from the plurality of blocks based on the plurality of parameters to obtain rank of the each block, and may select at least one block having a highest rank from the plurality of blocks as the at least one block to capture the screenshot.

Here, the plurality of parameters includes at least one of a layout of the blocks, an application type, a type of content, an application identification (ID), a screen ID and user-specific parameters including at least one of a history of user action specific to a contents type, a current location of the user, and a browsing pattern or history of the user.

Also, the processor (130) may recognize the contents displayed on the screen of the electronic device (100), and may identify a relationship between the contents displayed on the screen of the electronic device (100) based on the recognition, and may identify the screen of the electronic device (100) based on the relationship between the contents displayed on the screen of the electronic device (100).

Here, the processor (130) may identify the screen of the electronic device (100) based on the relationship between the contents displayed on the screen of the electronic device (100) to obtain the screen ID of the contents displayed on the screen of the electronic device (100).

Here, the processor (130) may extract a screen pattern based on the identified screen of the electronic device (100), and may identify whether the extracted screen pattern matches at least one stored screen pattern of the electronic device (100), and may perform one of: assigning the screen ID to the contents displayed on the screen of the electronic device (100) in response to identifying that the extracted screen pattern matches the at least one stored screen pattern, and assigning a new screen ID to the contents displayed on the screen of the electronic device (100) in response to identifying that the extracted screen pattern does not match with the at least one stored screen pattern and store the new screen ID in the electronic device (100).

Here, the processor (130) may receive at least one static block associated with the extracted screen pattern by comparing with the at least one stored screen pattern, and may arrange the extracted screen pattern based on a block distance score calculation, and may calculate a block-wise difference score and a pattern difference score of the extracted screen pattern with each of stored screen pattern for the at least one static block and at least one dynamic block.

Further, the processor (130) may identify whether the pattern difference score is higher than a threshold, and may perform one of: the extracted screen pattern matches the at least one stored screen pattern in response to identifying that the pattern difference score is higher than the threshold, and the extracted screen pattern does not match with the at least one stored screen pattern in response to identifying that the pattern difference score is lower than the threshold.

Meanwhile, the processor (130) may identify whether at least one suggestion for the at least one block receives from a user of the electronic device (100), and may perform one of: sharing the screenshot of the at least one block to the at least one second user in response to identifying that at least one suggestion for the at least one block does not receive from the user of the electronic device (100), and sharing the screenshot of at least one suggested block to the at least one second user in response to identifying that at least one suggestion for the at least one block receives from the user of the electronic device (100).

Also, the at least one block is highlighted to capture the screenshot.

Meanwhile, the ranking is modified based on at least one action associated with the user of the electronic device (100), and the at least one action includes a zoom-in action, a zoom-out action, and a scrolling action.

Meanwhile, the plurality of blocks includes at least one of at least one image block, at least one icon block, and at least one text block.

Also, the screenshot of the at least one block is stored in the electronic device (100) and performs at least one-second action, and the at least one-second action includes at least one of editing on the screenshot of the at least one block and sharing the screenshot of the at least one block to at least one second user.

Meanwhile, the contents are recognized by at least one of a position of each block, proximity of each block, and dimensions of each block.

Figure 2B:
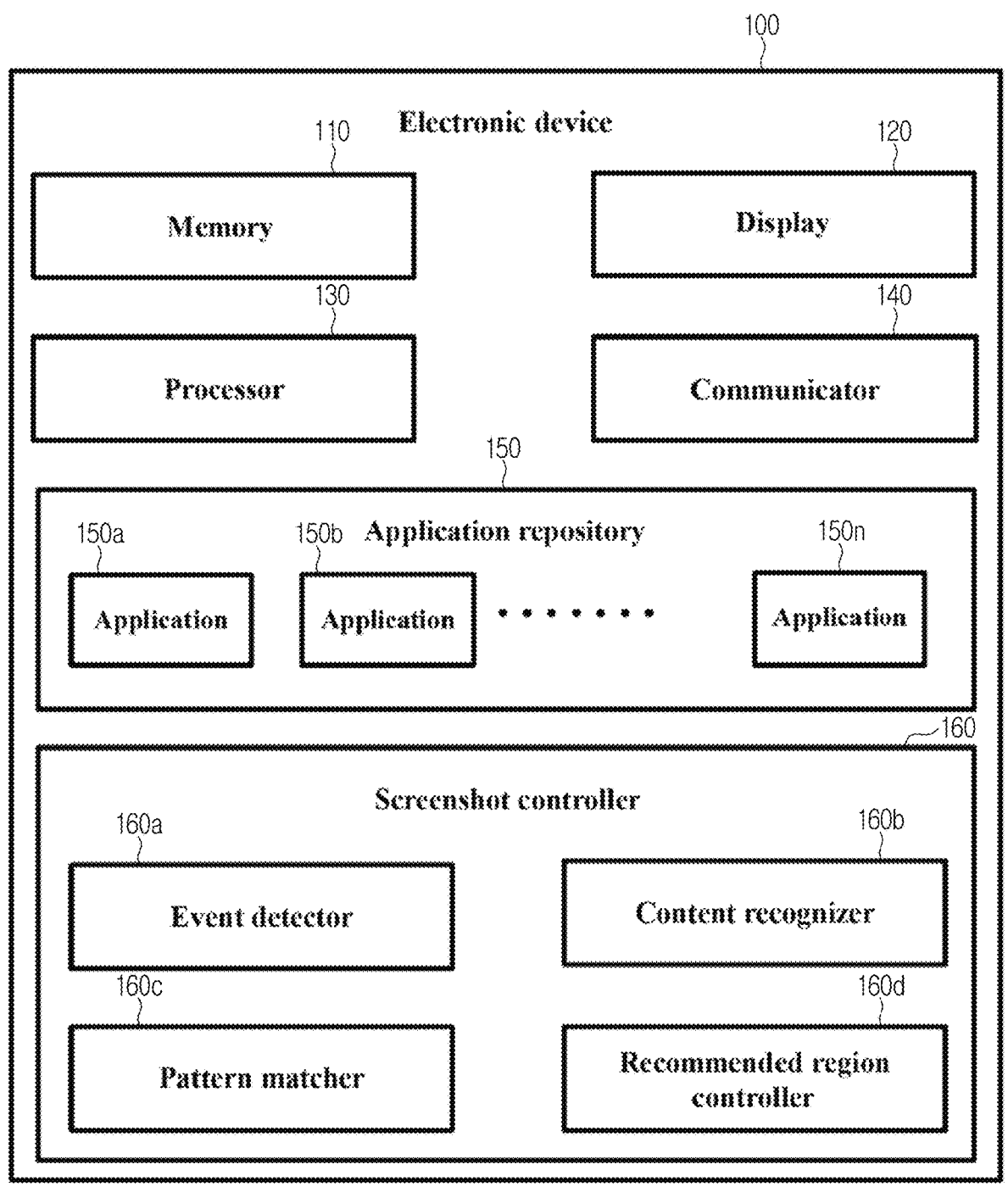
FIG. 2B illustrates a block diagram of the electronic device for intelligent screen capture, according to an embodiment.

FIG. 2B illustrates a block diagram of the electronic device (100) for intelligent screen capture, according to an embodiment. In an embodiment, the electronic device (100) includes a memory (110), a display (120), a processor (130), a communicator (140), an application (150) and a screenshot controller (160).

The memory (110) also stores instructions to be executed by the processor (130). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In certain examples, a non-transitory storage medium may store data that can, over time, change (e.g., in Random Access Memory (RAM) or cache). In an embodiment, the memory (110) can be an internal storage unit or it can be an external storage unit of the electronic device (100), an application repository (interchangeably used as application (150)), a cloud storage, or any other type of external storage.

The processor (130) communicates with the memory (110), the communicator (140), the display (120), the application (150), and the screenshot controller (160). The processor (130) is configured to execute instructions stored in the memory (110) and to perform various processes. The application (150) can be, for example, but not limited to game application, business application, education application, lifestyle application, entertainment application, utilities application, travel application, health-fitness application, food application or a like.

In an embodiment, the screenshot controller (160) includes an event detector (160a), a content recognizer (160b), a pattern matcher (160c), and a recommended region controller (160d). The event detector (160a) detects a screenshot capture event to capture a screenshot of contents displayed on a screen (i.e. display (120)) of the electronic device (100). The content recognizer (160b) recognizes the contents displayed on the screen of the electronic device (100). Further, the content recognizer (160b) determines a relationship between the contents displayed on the screen of the electronic device (100) based on the recognition. Further, the content recognizer (160b) divides the screen of the electronic device (100) into a plurality of blocks, where each of the blocks includes inter-related contents displayed on the screen of the electronic device (100) and obtains the screen ID of the contents displayed on the screen of the electronic device (100). The plurality of blocks includes at least one of at least one image block, at least one icon block, and at least one text block. The contents are recognized by at least one of a position of each block, proximity of each block, and dimensions of each block.

The pattern matcher (160c) extracts a screen pattern based on the divided screen of the electronic device (100). Further, the pattern matcher (160c) determines whether the extracted screen pattern matches at least one stored screen pattern (previously determined pattern is stored in the memory (110) for future uses to identify the screen ID) of the electronic device (100). Further, the pattern matcher (160c) assigns the screen ID to the contents displayed on the screen of the electronic device (100) in response to determining that the extracted screen pattern matches the at least one stored screen pattern. Further, the pattern matcher (160c) assigns a new screen ID to the contents displayed on the screen of the electronic device (100) in response to determining that the extracted screen pattern does not match with the at least one stored screen pattern and store the new screen ID in the electronic device (100).

Further, the pattern matcher (160c) detects at least one static block associated with the extracted screen pattern by comparing with the at least one stored screen pattern. Further, the pattern matcher (160c) arranges the extracted screen pattern based on a block distance score calculation. Further, the pattern matcher (160c) calculates a block-wise difference score and a pattern difference score of the extracted screen pattern with each of stored screen pattern for the at least one static block and at least one dynamic block. Further, the pattern matcher (160c) determines whether the pattern difference score is higher than a threshold. Further, the pattern matcher (160c) assigns the screen ID, the extracted screen pattern matches the at least one stored screen pattern in response to determining that the pattern difference score is higher than the threshold. Further, the pattern matcher (160c) assigns the new screen ID, the extracted screen pattern does not match with the at least one stored screen pattern in response to determining that the pattern difference score is lower than the threshold.

The recommended region controller (160d) maps each block from the plurality of blocks based on the plurality of parameters to obtain rank of the each block. The plurality of parameters includes at least one of a layout of the blocks, an application type, a type of content, an application ID, a screen ID and user-specific parameters including at least one of a history of user action specific to a contents type, a current location of the user, and a browsing pattern or history of the user. Further, the recommended region controller (160d) selects at least one block having a highest rank from the plurality of blocks as the at least one optimal block to capture the screenshot. The at least one optimal block is highlighted to capture the screenshot. The ranking is modified based on at least one action associated with the user of the electronic device (100), wherein the at least one action includes a zoom-in action, a zoom-out action, and a scrolling action.

Further, the recommended region controller (160d) determines whether at least one suggestion for the at least one optimal block receives from the user of the electronic device (100). Further, the recommended region controller (160d) shares the screenshot of the at least one optimal block to the at least one second user in response to determining that at least one suggestion for the at least one optimal block does not receive from the user of the electronic device (100). Further, the recommended region controller (160d) shares the screenshot of at least one suggested optimal block to the at least one second user in response to determining that at least one suggestion for the at least one optimal block receives from the user of the electronic device (100).

At least one of the plurality of modules components may be implemented through an AI model. A function associated with AI may be performed through memory (110) and the processor (130).

The processor (130) may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning process include, but are not limited to, supervised learning, unsupervised learning, semi-supervised learning, or reinforcement learning.

Although the FIG. 2B shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the invention. One or more components can be combined together to perform same or substantially similar function for intelligent screen capture in the electronic device (100).

Figure 3A:
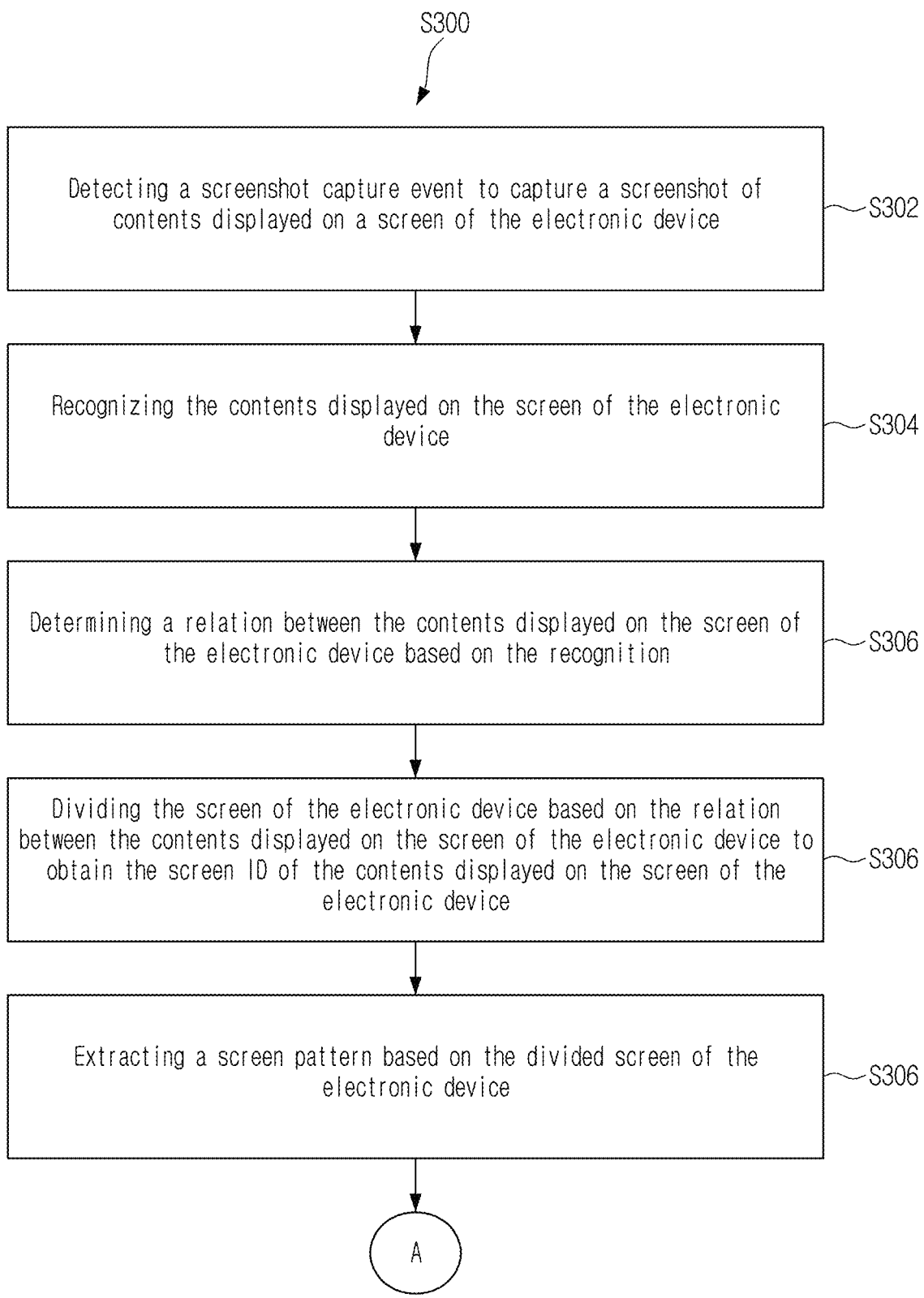
FIG. 3A is a flow diagram illustrating a method for intelligent screen capture in the electronic device, according to an embodiment.

FIG. 3A is a flow diagram (S300) illustrating a method for intelligent screen capture in the electronic device (100), according to an embodiment. The operations (S302-S336) are performed by the screenshot controller (160).

At S302, the method includes detecting the screenshot capture event to capture the screenshot of contents displayed on the screen of the electronic device (100). At S304, the method includes recognizing the contents displayed on the screen of the electronic device (100). At S306, the method includes determining the relationship between the contents displayed on the screen of the electronic device (100) based on the recognition. At S308, the method includes dividing the screen of the electronic device (100) based on the relationship between the contents displayed on the screen of the electronic device (100) to obtain the screen ID of the contents displayed on the screen of the electronic device (100). At S310, the method includes extracting a screen pattern based on the divided screen of the electronic device (100).

Figure 3B:
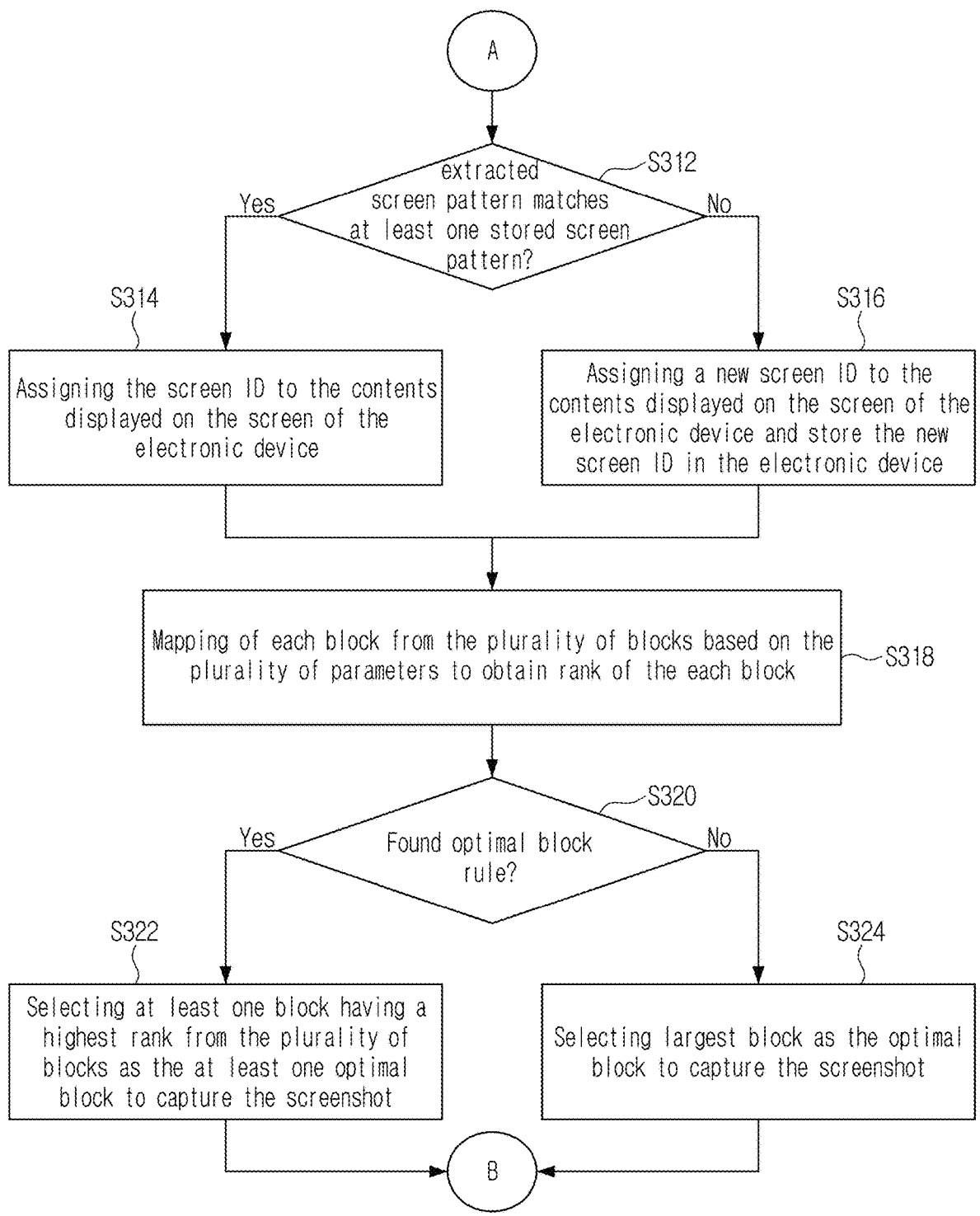
Figure 3D:
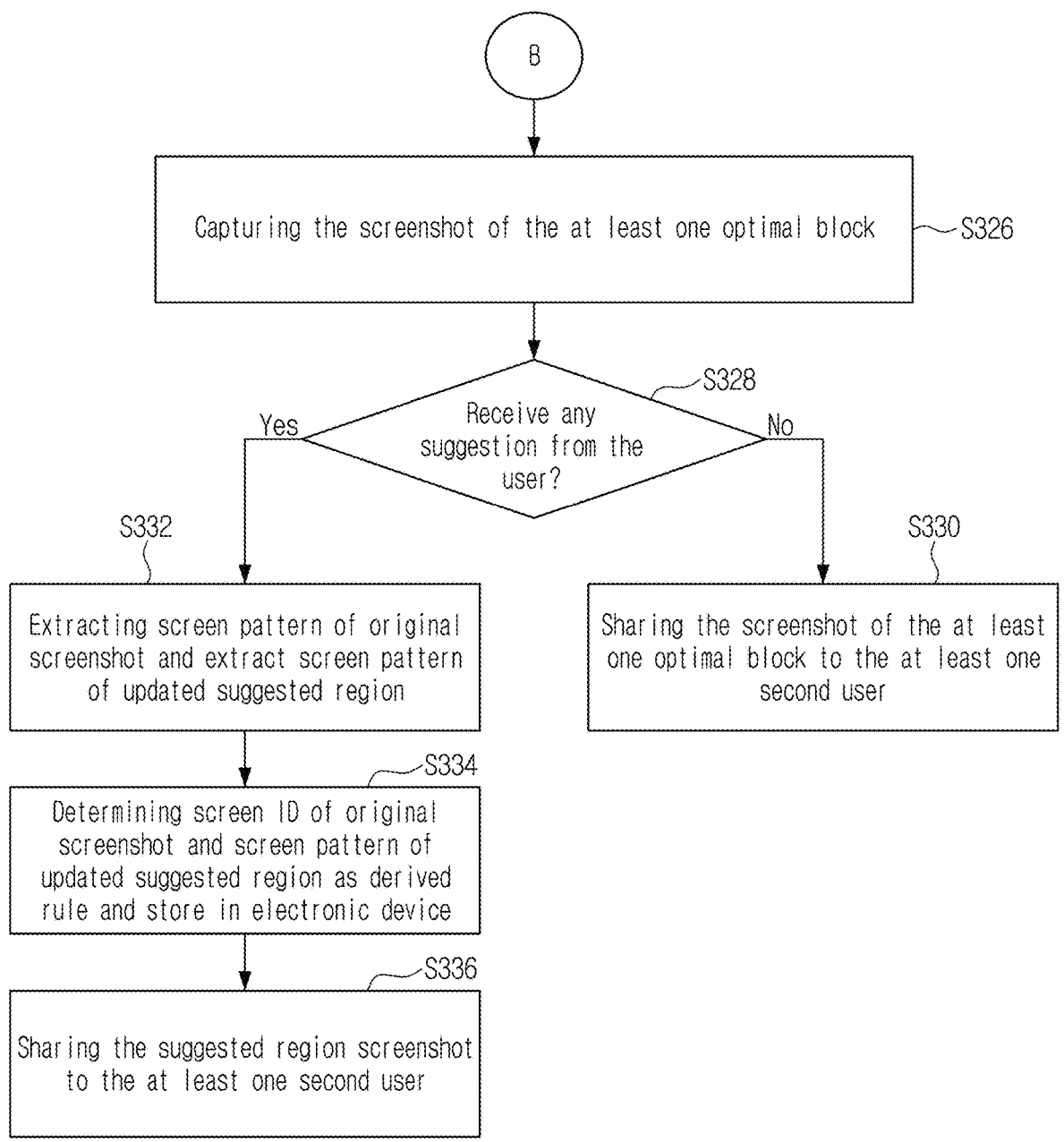

FIGS. 3B, 3C, and 3D is a flow diagram illustrating a method for determining whether the extracted screen pattern matches at least one stored screen pattern of the electronic device, according to an embodiment. At S312, the method includes determining, by the electronic device (100), whether the extracted screen pattern matches at least one stored screen pattern of the electronic device (100). At S314, the method includes assigning the screen ID to the contents displayed on the screen of the electronic device (100) in response to determining that the extracted screen pattern matches the at least one stored screen pattern. At S316, the method includes assigning the new screen ID to the contents displayed on the screen of the electronic device (100) in response to determining that the extracted screen pattern does not match with the at least one stored screen pattern and store the new screen ID in the electronic device (100). At S318, the method includes mapping of each block from the plurality of blocks based on the plurality of parameters to obtain rank of the each block. At S320, the method includes determining whether the assigned screen ID is associates with at least one optimal block rule (i.e. region rule). At S322, the method includes selecting at least one block having the highest rank from the plurality of blocks as the at least one optimal block to capture the screenshot in response to determining that the assigned screen ID associates with the at least one optimal block rules. At S324, the method includes selecting a largest block as the optimal block to capture the screenshot in response to determining that the assigned screen ID does not associate with the at least one optimal block rule.

At S326, the method includes capturing the screenshot of the at least one optimal block. At S328, the method includes determining whether at least one suggestion (e.g. most prominent) for the at least one optimal block receives from the user of the electronic device (100). At S330, the method includes sharing the screenshot of the at least one optimal block to the at least one second user in response to determining that at least one suggestion for the at least one optimal block does not receive from the user of the electronic device (100). At S332, the method includes extracting screen pattern of original screenshot and extract screen pattern of updated suggested region in response to determining that at least one suggestion for the at least one optimal block receives from the user of the electronic device (100). At S334, the method includes determining screen ID of original screenshot and uses screen pattern of updated suggested region as derived rule and store in electronic device (100). At S336, the method includes sharing the suggested region screenshot to the at least one second user.

FIG. 3B is a flow diagram (S312) illustrating a method for determining whether the extracted screen pattern matches at least one stored screen pattern of the electronic device (100), according to an embodiment. The operations (S312a-S312e) are performed by the screenshot controller (160).

At S312a, the method includes detecting at least one static block associated with the extracted screen pattern by comparing with the at least one stored screen pattern. At S312b, the method includes arranging the extracted screen pattern based on a block distance score calculation. At S312c, the method includes calculating a block-wise difference score and a pattern difference score of the extracted screen pattern with each of stored screen pattern for the at least one static block and at least one dynamic block. At S312d, the method includes determining whether the pattern difference score is higher than a threshold. At S312e, the method includes assigning the screen ID when the extracted screen pattern matches the at least one stored screen pattern. At 312f, the method includes assigning the new screen ID when the extracted screen pattern does not match with the at least one stored screen pattern.

Figure 4A:
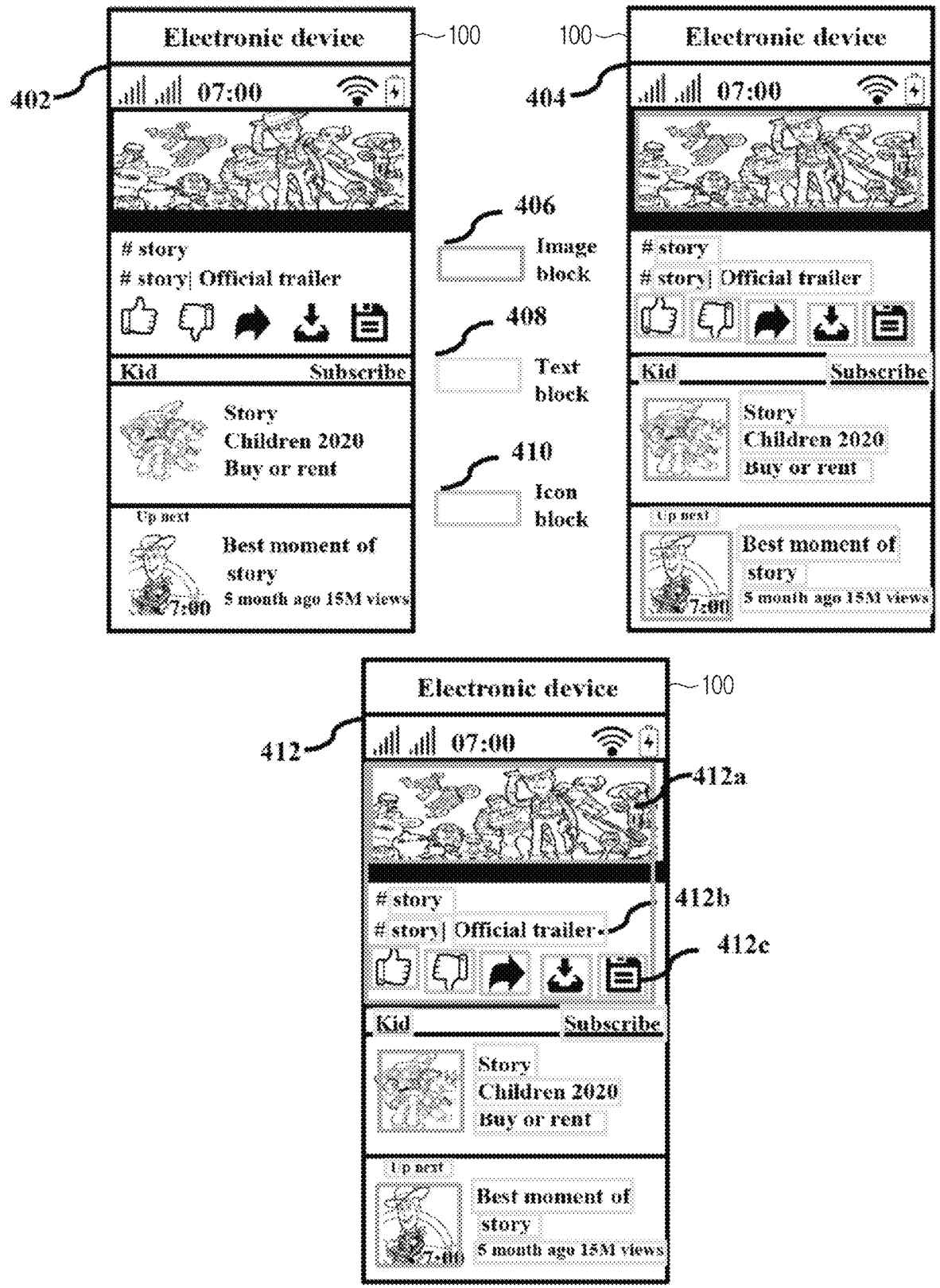
FIGS. 4A, 4B, and 4C is an example scenario illustrating various operations for intelligent screen capture in the electronic device, according to an embodiment.
Figure 4B:
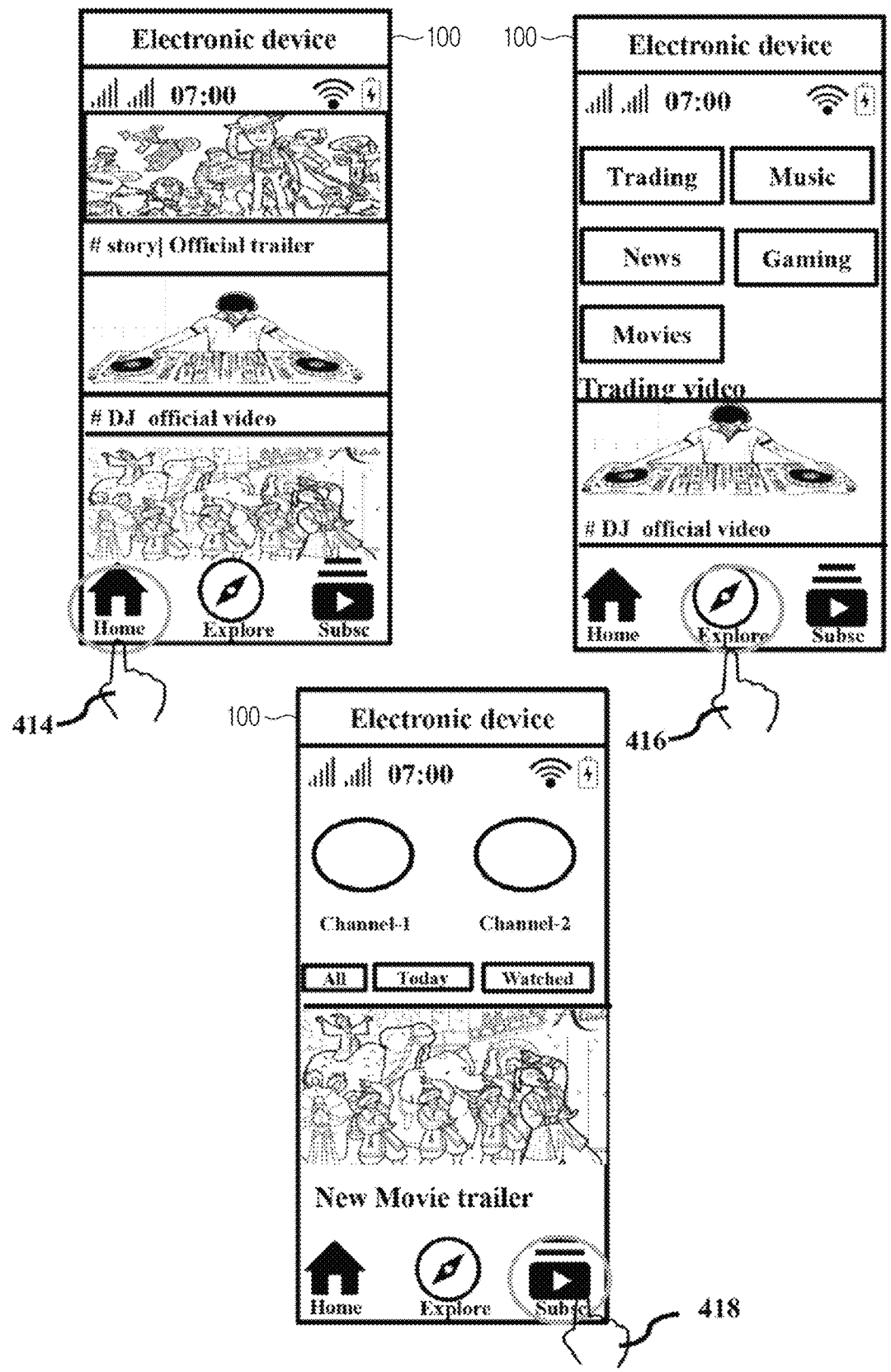
Figure 4C:
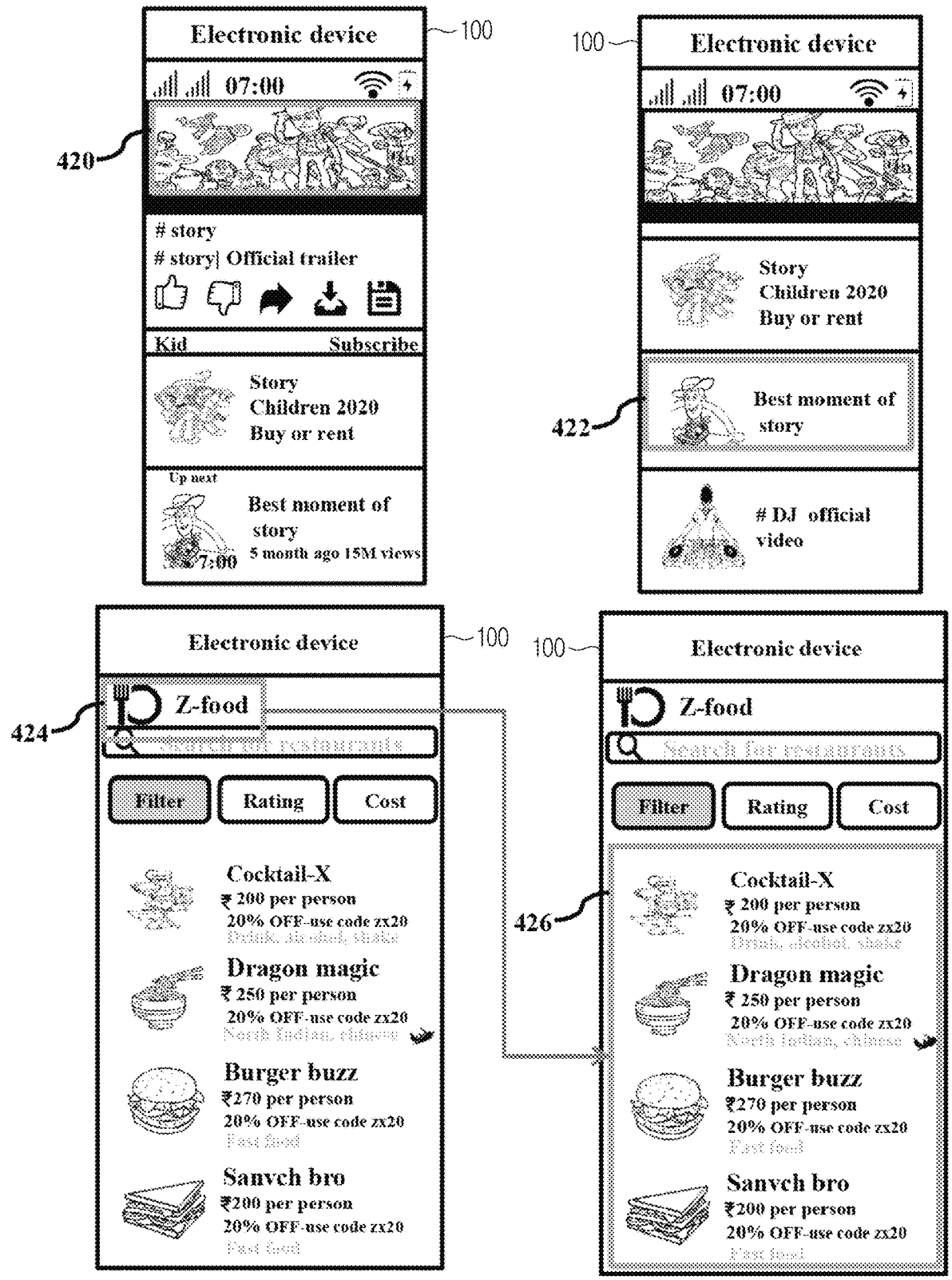

FIGS. 4A, 4B, and 4C is an example scenario illustrating various operations for intelligent screen capture in the electronic device (100), according to an embodiment.

At 402, the user of the electronic device (100) watching a video on the video application (150a) of the electronic device (100) and the event detector (160a) detects the screenshot capture event to capture a screenshot of contents displayed on the screen of the electronic device (100), the screenshot capture event can be performed by receiving at least one of a gesture input of the user of the electronic device (100), using combination of buttons associated with the electronic device (100), using feature and/or functionality of at least one second application (150b-150n) of the electronic device (100) or a like.

At 404, the content recognizer (160b) recognizes the contents displayed on the screen of the electronic device (100). Further, the content recognizer (160b) determines the relationship between the contents displayed on the screen of the electronic device (100) based on the recognition. Further, the content recognizer (160b) divides the screen of the electronic device into the plurality of blocks, where each of the blocks includes inter-related contents displayed on the screen of the electronic device (100). The plurality of blocks includes at least one of at least one image block (406), at least one text block (408), and at least one icon block (410).

The contents are recognized by at least one of the position of each block, proximity of each block, and dimensions of each block.

At 412, the content recognizer (160b) determines relationship (semantic relationship) between GUI elements (e.g. image, text, icon, etc.) and each block displayed on the screen of the electronic device (100). The image block (412a), the text block (412b) below and the row of icons (412c) are semantically related since they are present together in the screen region which is separated by lines.

The pattern matcher (160c) extracts the screen pattern based on the divided screen of the electronic device (100). Examples of the screen patterns associated with video application (150a) of the electronic device (100) are home screen pattern (414), explore screen pattern (416), and subscriber screen pattern (418). Each icon undergoes visible change during screen switch. The difference is detected by the pattern matcher (160c). Further, the pattern matcher (160c) detects at least one static block associated with the extracted screen pattern by comparing with the at least one stored screen pattern. The static block are blocks whose co-ordinates are same for each pattern (414, 416, 418) for the given application (i.e. video application (150a).

Further, the pattern matcher (160c) arranges the extracted screen pattern based on the block distance score calculation. The pattern matcher (160c) calculates block distance score calculation. The pattern matcher (160c) encodes screen pattern to string by scanning each block displayed on the screen of the electronic device (100). For example, BLT-BIBTBLLLL. Where 'B' represents beginning of block, 'T' represents text block, 'I' represents image block, and 'L' represents icon block. Further, the pattern matcher (160c) calculates distance score between extracted pattern encoded string and encoded string of the stored pattern. The block distance score is minimum distance score against each of the stored pattern. Further, the pattern matcher (160c) arranges the encoded string of extracted pattern using circular shift to match the pattern selected based on block distance score. Further, the pattern matcher (160c) calculates the block-wise difference score.

$$\text{Block difference score} = \text{sum of (element score of } i^{th} \text{ element is block } j^{th} \text{ of first pattern} - \text{element score of } i^{th} \text{ element is block } j^{th} \text{ of second pattern)} \quad (1)$$

Where, element score is text block score (T-score) or image block score (I-score) or icon block score (L-score) based on element type (i.e. text, image, icon).

Further, the pattern matcher (160c) calculates the pattern difference score of the extracted screen pattern with each of stored screen pattern for the at least one static block and at least one dynamic block.

$$\text{Pattern difference score} = (\text{alpha}*\text{sum of static block difference scores} + \text{beta}*\text{sum of dynamic block difference score}) \quad (2)$$

Where, alpha and beta are the learned hyper parameters.

Further, the pattern matcher (160c) determines whether the pattern difference score is higher than the threshold and assign screen ID when pattern difference score is higher than the threshold. Based on the assigned screen ID and the plurality of parameters associated with the screen ID, the recommended region controller (160d) determines ranks (ranking rule) for each block from the plurality of blocks, as per Table. 1.

TABLE 1

| Application ID | Screen ID | Application type | Region rule | Action type/ Location |
| --- | --- | --- | --- | --- |
| com.fac | Newsfeed | Social | Image followed by text | — |
| com.gogle | Homepage | Content provider | Image | — |
| com.video | Playing video page | Content provider | Image with text center aligned | Scrolling |
| com.shop | Homepage | Shopping | Center aligned block/semantic relationship | — |
| com.bookmyshow | Ticket confirm page | Event booking | Location: Home Show: Text Location: Movie theater Show: Image | LocationID |
| Default | Default | Default | Biggest block | — |

Further, the recommended region controller (160d) selects the at least one block having the highest rank from the plurality of blocks as the at least one optimal block to capture the screenshot, example of rule ID as per Table. 2.

TABLE 2

| Rule ID | Rule description |
| --- | --- |
| 1 | Only image |
| 2 | Only text |
| 3 | Biggest image block |
| 4 | Image block with text and center aligned |
| 5 | Center aligned block |
| 6 | Image followed by text |
| 7 | Image preceded by text |
| 8 | Semantic based (position, proximity, dimensions) |

At 420, shows an example scenario where the recommended region controller (160d) selects a biggest block having the highest rank (default rule) from the plurality of blocks as the at least one optimal block to capture the screenshot. At 422, shows an example scenario where the recommended region controller (160d) selects central block having the highest rank from the plurality of blocks as the optimal block to capture the screenshot. The highest rank is determines based on scrolling action of the user of the electronic device (100), the scrolling action set focus on the specific block from the plurality of blocks and as per the rule the recommended region controller (160d) selects "Image with text center aligned" as the optimal block. The center aligned rule is previously learned from usage of the user of the electronic device (100) for specific application ID (e.g. com.video) and screen ID (e.g. playing video page).

At 424 and 426, shows an example scenario where the recommended region controller (160d) selects Center aligned block/semantic relationship having the highest rank from the plurality of blocks as the optimal block to capture the screenshot for specific application ID (e.g. com.shop) and screen ID (e.g. Homepage).

Figure 5:
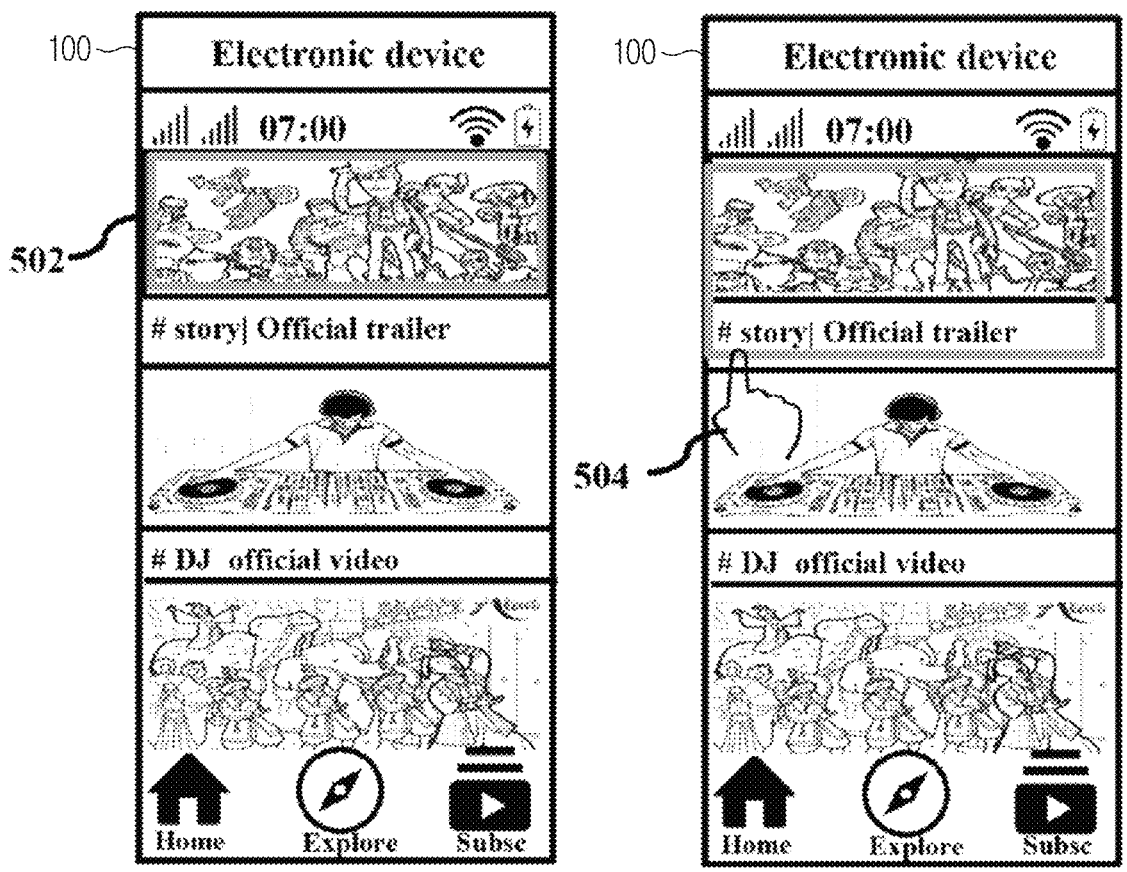
FIG. 5 is an example scenario illustrating various operations for learning the optimal block from the plurality of blocks to capture the screenshot based on the plurality of parameters, according to an embodiment.

FIG. 5 is an example scenario illustrating various operations for learning the optimal block from the plurality of blocks to capture the screenshot based on the plurality of parameters, according to an embodiment.

At 502, the recommended region controller (160d) selects the biggest block having the highest rank from the plurality of blocks as the optimal block to capture the screenshot. At 504, the recommended region controller (160d) receives at least one suggestion (most prominent) for the at least one optimal block receives from the user of the electronic device (100). Based on the suggestion (e.g. crop, zoom-in, zoom-out, etc.) the optimal block is modified. Then, the recommended region controller (160d) updates the rules associated with at least one of application ID, screen ID, and type of the application (150) and stores in the memory (110). Furthermore, the modified optimal block shares to the at least one second user.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for controlling an electronic device, the method comprising:
    receiving, by the electronic device, a user input for capturing a screenshot of contents displayed on a screen of the electronic device, the user input being provided by a user of the electronic device;
    recognizing, by the electronic device, the contents displayed on the screen, wherein each individual content is recognized as one from among an image, a text string, and an icon;
    identifying, by the electronic device, the contents having a semantic relationship based on the recognizing;
    dividing, by the electronic device, the screen into a plurality of blocks based on the identified semantic relationship;
    obtaining a rank for each block based on a plurality of parameters;
    identifying, by the electronic device, at least one block to be captured as the screenshot, from the plurality of blocks based the obtained rank of the each block; and
    displaying, by the electronic device, a guide user interface for capturing the screenshot of the at least one block.

2. The method as claimed in claim 1, wherein the identifying the at least one block further comprises:
    mapping, by the electronic device, each block from the plurality of blocks based on the plurality of parameters to obtain the rank of the each block; and
    selecting, by the electronic device, a block having a highest rank from the plurality of blocks as the at least one block to be captured as the screenshot.

3. The method as claimed in claim 1, wherein the plurality of parameters comprises at least one of a layout of the plurality of blocks, an application type, a type of content, an application identification (ID), a screen ID, or user-specific parameters including at least one of a history of user action specific to a contents type, a current location of the user, or a browsing pattern or history of the user.

4. The method as claimed in claim 1, further comprising:
obtaining a screen identification (ID) of the contents displayed on the screen, based on the dividing the screen.

5. The method as claimed in claim 4, wherein the obtaining the screen ID of the contents further comprises:
extracting, by the electronic device, a screen pattern based on the divided screen of the electronic device;
identifying, by the electronic device, whether the extracted screen pattern matches at least one stored screen pattern stored in the electronic device; and
performing, by the electronic device, one of:
assigning the screen ID to the contents displayed on the screen based on the identifying that the extracted screen pattern matches the at least one stored screen pattern, or
assigning a new screen ID to the contents displayed on the screen based on the identifying that the extracted screen pattern does not match the at least one stored screen pattern, and storing the new screen ID in the electronic device.

6. The method as claimed in claim 5, wherein the identifying whether the extracted screen pattern matches the at least one stored screen pattern further comprises:
identifying, by the electronic device, at least one static block associated with the extracted screen pattern, by comparing the extracted screen with the at least one stored screen pattern;
arranging, by the electronic device, the extracted screen pattern based on a block distance score calculation;
calculating, by the electronic device, a block-wise difference score between the extracted screen pattern and each of the at least one stored screen pattern for the at least one static block and at least one dynamic block, respectively;
calculating, by the electronic device, a pattern difference score based on the block-wise difference score calculated for the at least one stored screen pattern and the block-wise difference score calculated for the at least one dynamic block;
identifying, by the electronic device, whether the pattern difference score is higher than a threshold; and
performing, by the electronic device, one of:
identifying that the extracted screen pattern matches the at least one stored screen pattern based on the identifying that the pattern difference score is higher than the threshold, or
identifying that the extracted screen pattern does not match the at least one stored screen pattern based on the identifying that the pattern difference score is lower than the threshold.

7. The method as claimed in claim 1, further comprising:
capturing the screenshot of the at least one block;
identifying, by the electronic device, whether at least one suggestion for at least one another block is received via a user selection input from the user through the electronic device; and
performing, by the electronic device, one of:
sharing the screenshot of the at least one block with at least one another user based on the identifying that the at least one suggestion for the at least one another block is not received from the user of the electronic device, or sharing the screenshot of the at least one another block with the at least one another user based on the identifying that the at least one suggestion for the at least one another block is received from the user of the electronic device.

8. The method as claimed in claim 1, wherein the at least one block is highlighted to capture the screenshot.

9. The method as claimed in claim 2, wherein the rank is modified based on at least one action associated with the user of the electronic device, and
wherein the at least one action comprises at least one of a zoom-in action, a zoom-out action, or a scrolling action.

10. The method as claimed in claim 1, wherein the plurality of blocks comprises at least one of at least one image block, at least one icon block, or at least one text block.

11. The method as claimed in claim 1, further comprising:
capturing the screenshot of the at least one block;
storing the screenshot of the at least one block in the electronic device; and
using the screenshot to perform at least one action,
wherein the at least one action comprises at least one of editing on the screenshot of the at least one block or sharing the screenshot of the at least one block with at least one another user.

12. The method as claimed in claim 1, wherein the semantic relationship of the contents is identified by at least one of a position or a proximity of the contents, respectively.

13. An electronic device comprising:
a memory;
a display; and
a processor coupled to the memory and configured to:
receive a user input for capturing a screenshot of contents displayed on a screen of the electronic device,
recognize the contents displayed on the screen, wherein each individual content is recognized as one from among an image, a text string, and an icon,
identify the contents having a semantic relationship based on the recognizing,
divide the screen into a plurality of blocks based on the identified semantic relationship,
obtain a rank for each block based on a plurality of parameters,
identify at least one block to be captured as the screenshot, from the plurality of blocks based on the obtained rank of the each block, and
control the display to display a guide user interface for capturing the screenshot of the at least one block.

14. The electronic device as claimed in claim 13, wherein the processor is further configured to:
map each block from the plurality of blocks based on the plurality of parameters to obtain the rank of the each block; and
select a block having a highest rank from the plurality of blocks as the at least one block to be captured as the screenshot.

15. The electronic device as claimed in claim 13, wherein the plurality of parameters comprises at least one of a layout of the plurality of blocks, an application type, a type of content, an application identification (ID), a screen ID, or user-specific parameters including at least one of a history of user action specific to a contents type, a current location of a user, or a browsing pattern or history of the user.

16. The electronic device as claimed in claim 13, wherein the processor is further configured to:

based on the dividing the screen, obtain a screen identification (ID) of the contents displayed on the screen.

17. The electronic device as claimed in claim 16, wherein the processor is further configured to:
  extract a screen pattern based on the divided screen of the electronic device,
  identify whether the extracted screen pattern matches at least one stored screen pattern of the electronic device and,
  perform one of:
    assign the screen ID to the contents displayed on the screen based on the identifying that the extracted screen pattern matches the at least one stored screen pattern, or
    assign a new screen ID to the contents displayed on the screen based on the identifying that the extracted screen pattern does not match the at least one stored screen pattern and store the new screen ID in the electronic device.

18. The electronic device as claimed in claim 17, wherein the processor is further configured to:
  identify at least one static block associated with the extracted screen pattern, by comparing the extracted screen pattern with the at least one stored screen pattern,
  arrange the extracted screen pattern based on a block distance score calculation,
  calculate a block-wise difference score between the extracted screen pattern and each of the at least one stored screen pattern for the at least one static block and at least one dynamic block, respectively,
  calculate a pattern difference score based on the block-wise difference score calculated for the at least one stored screen pattern and the block-wise difference score calculated for the at least one dynamic block,
  identify whether the pattern difference score is higher than a threshold, and perform one of:
    identify that the extracted screen pattern matches the at least one stored screen pattern based on the identifying that the pattern difference score is higher than the threshold, or
    identify that the extracted screen pattern does not match the at least one stored screen pattern based on the identifying that the pattern difference score is lower than the threshold.

\* \* \* \* \*